United States Patent
Pharo

(10) Patent No.: US 8,613,259 B1
(45) Date of Patent: Dec. 24, 2013

(54) DUST FREE LITTER BOX

(71) Applicant: Thomas G. Pharo, Birmingham, AL (US)

(72) Inventor: Thomas G. Pharo, Birmingham, AL (US)

(*) Notice: Subject to any disclaimer, the term of this patent is extended or adjusted under 35 U.S.C. 154(b) by 0 days.

(21) Appl. No.: 13/783,870

(22) Filed: Mar. 4, 2013

Related U.S. Application Data

(60) Provisional application No. 61/619,059, filed on Apr. 2, 2012.

(51) Int. Cl.
*A01K 1/01* (2006.01)

(52) U.S. Cl.
USPC ............................................ 119/163; 119/165

(58) Field of Classification Search
USPC ................ 119/163, 161, 165, 166, 167, 500; D30/161
See application file for complete search history.

(56) References Cited

U.S. PATENT DOCUMENTS

| | | | |
|---|---|---|---|
| 4,552,093 A | 11/1985 | Puckett | |
| 5,044,325 A | 9/1991 | Miksitz | |
| 5,307,761 A * | 5/1994 | Berger et al. | 119/165 |
| 5,315,964 A * | 5/1994 | Mimms et al. | 119/165 |
| 5,511,513 A | 4/1996 | Baron et al. | |
| 5,564,364 A * | 10/1996 | Kovacs et al. | 119/163 |
| 5,738,040 A * | 4/1998 | Simmons | 119/165 |
| 6,079,364 A * | 6/2000 | Tamba | 119/163 |
| 6,123,048 A | 9/2000 | Alkire et al. | |
| 6,176,201 B1 | 1/2001 | Fields | |
| 6,341,579 B1 * | 1/2002 | Alkire et al. | 119/165 |
| D612,554 S | 3/2010 | Seager et al. | |
| 2003/0168017 A1 | 9/2003 | Perelli et al. | |

* cited by examiner

*Primary Examiner* — T. Nguyen

(57) ABSTRACT

A dust-free litter box system for capturing stray particles generated when a pet uses a litter box features an inner tray with a plurality of slots. A fan notch is centrally located in a posterior tray wall for receiving a fan assembly. The inner tray features motion sensors connected to a power source. An air tube assembly is located around an outer perimeter of the inner tray close to an inner tray top edge. The air tube assembly features perforated tubing connected to the plurality of slots and an air tube manifold connected to a fan shroud. A fan aperture is centrally located in a posterior outer tray wall for receiving a fan filter and a protective grill. The inner tray is located in the outer tray.

4 Claims, 6 Drawing Sheets

shows a cross-sectional view of the present invention in a sagittal plane featuring the fan assembly.

DUST FREE LITTER BOX

CROSS REFERENCE

This application claims priority to U.S. patent application Ser. No. 61/619,059 filed Apr. 2, 2012, the specification(s) of which is/are incorporated herein in their entirety by reference.

FIELD OF THE INVENTION

The present invention relates to litter boxes for pets.

BACKGROUND OF THE INVENTION

A litter box is an indoor disposal container for pets that are permitted free roam of a home but who do not always go outside to relieve themselves. In the wild, cats naturally excrete in soft or sandy soil for easy burial and use their paws in a back sweeping motion to cover their feces. Stimulating this instinctive desire, a litter box's bottom is filled typically with an inch or more of cat litter, a loose, granular material that absorbs moisture and odors. The use of cat litter, however, generates a consistent supply of dust whenever the pet attempts to bury their feces. The present invention features a dust-free litter box system for capturing stray particles generated when a pet uses a litter box.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

A dust-free litter box system for capturing stray particles generated when a pet uses a litter box comprises an inner tray having a plurality of slots disposed therein. In some embodiments, a fan notch is centrally disposed in a posterior tray wall for receiving a fan assembly. In some embodiments, the inner tray comprises a plurality of motion sensors disposed therein operatively connected to a power source.

In some embodiments, an air tube assembly is disposed around an outer perimeter of the inner tray proximal to an inner tray top edge. In some embodiments, the air tube assembly comprises perforated tubing. In some embodiments, the plurality of slots is fluidly connected to the perforated tubing. In some embodiments, the air tube assembly comprises an air tube manifold adapted to fluidly connect to a fan shroud.

In some embodiments, the system comprises an outer tray. In some embodiments, a first outer tray wall and a second outer tray wall each comprise a handle slot. In some embodiments, a fan aperture is centrally disposed in a posterior outer tray wall and is adapted to receive a fan filter and a protective grill. In some embodiments, the inner tray is disposed in the outer tray.

DESCRIPTION OF PREFERRED EMBODIMENTS

Figure 1:
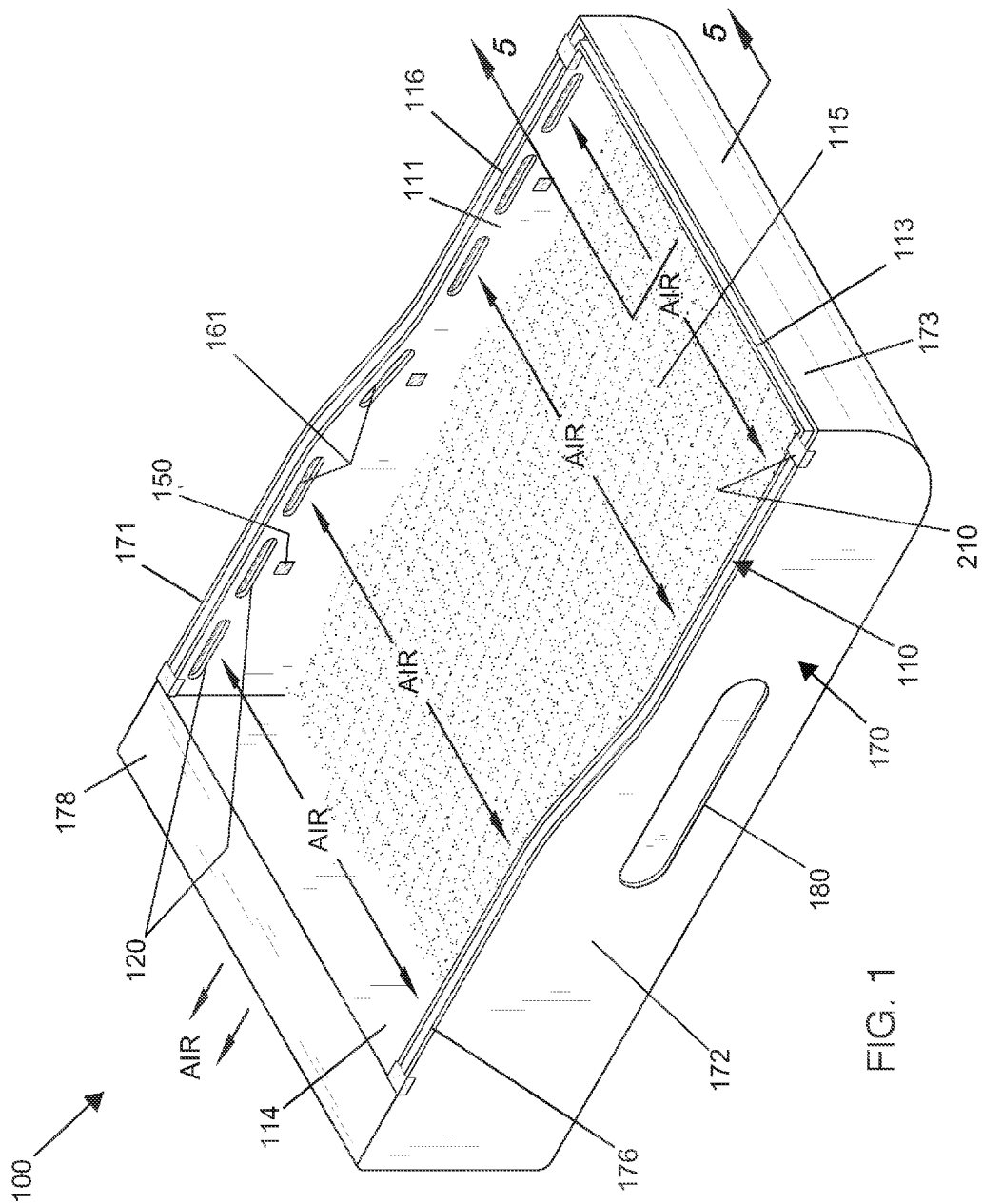
FIG. 1 shows a perspective view of the present invention.
Figure 2:
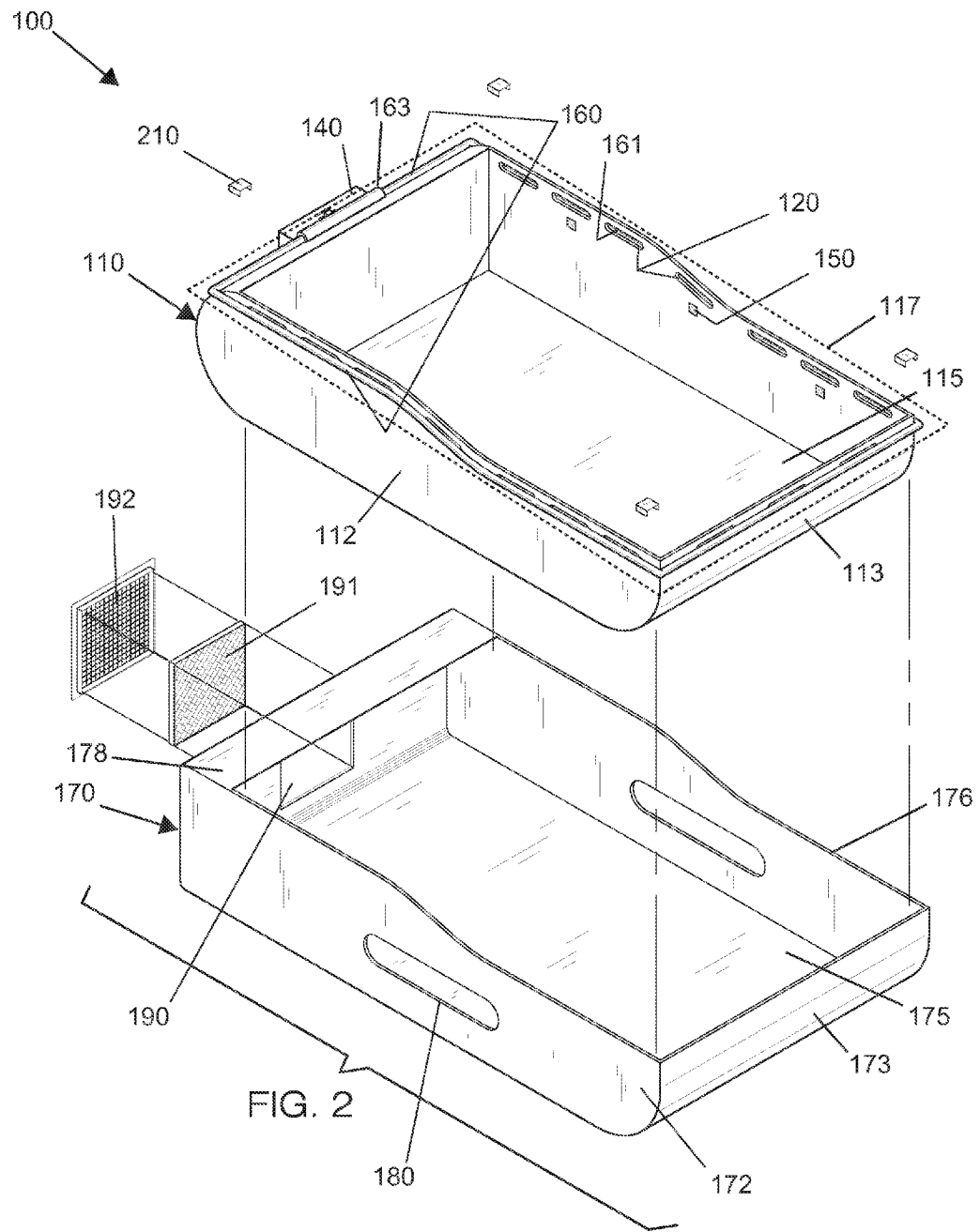
FIG. 2 shows an exploded view of the present invention.
Figure 3:
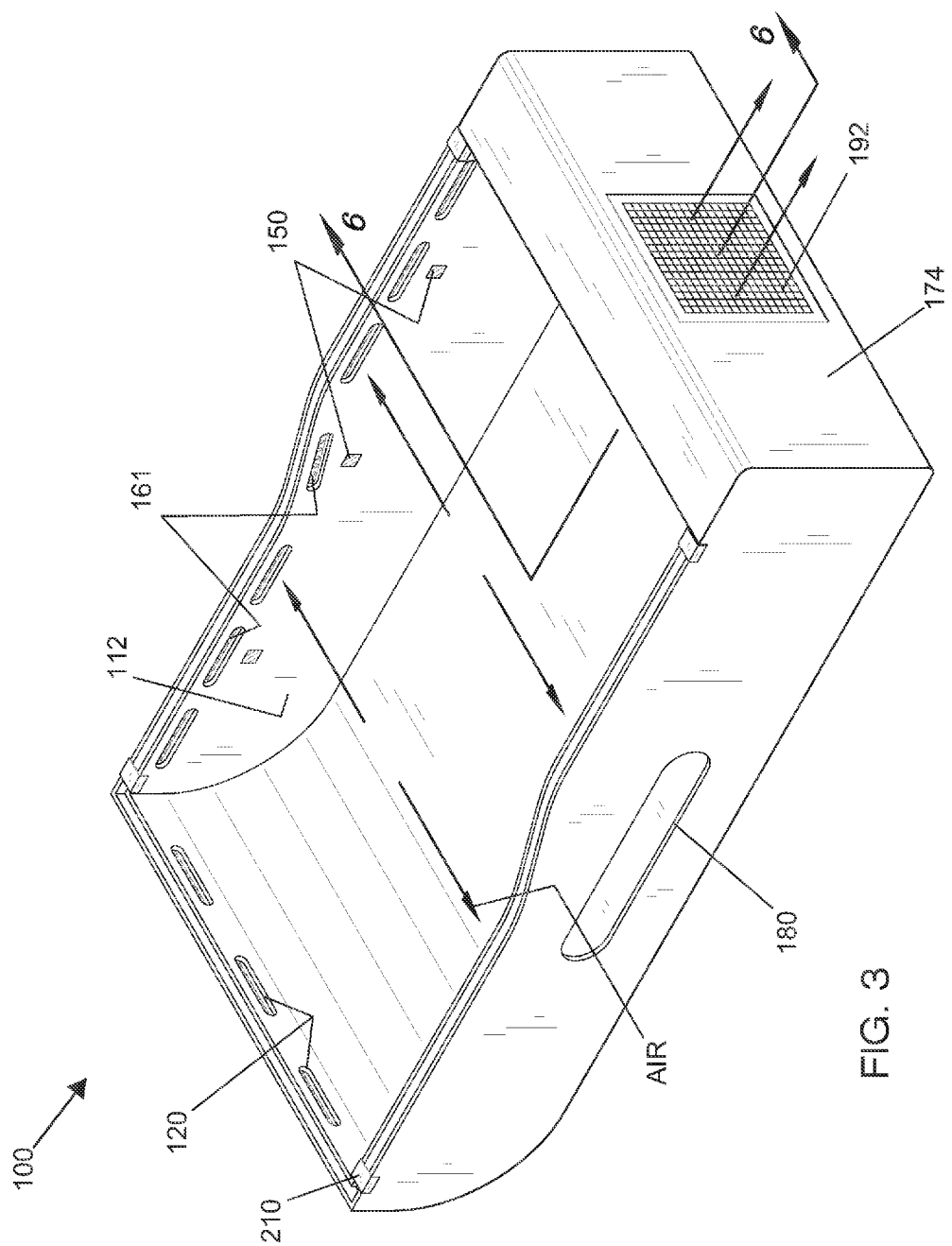
FIG. 3 shows a perspective view of the present invention.
Figure 4:
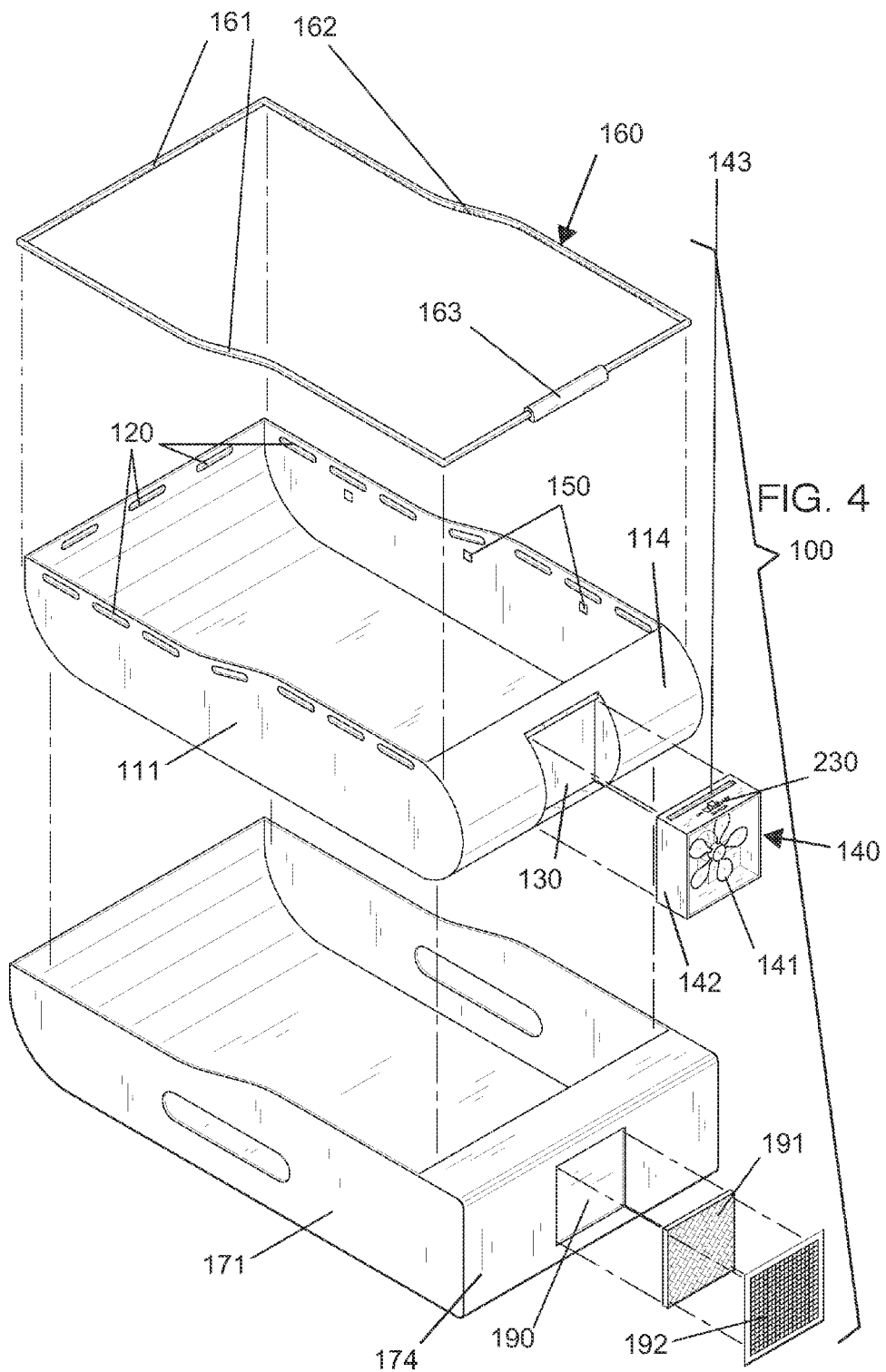
FIG. 4 shows an exploded view of the present invention.
Figure 5:
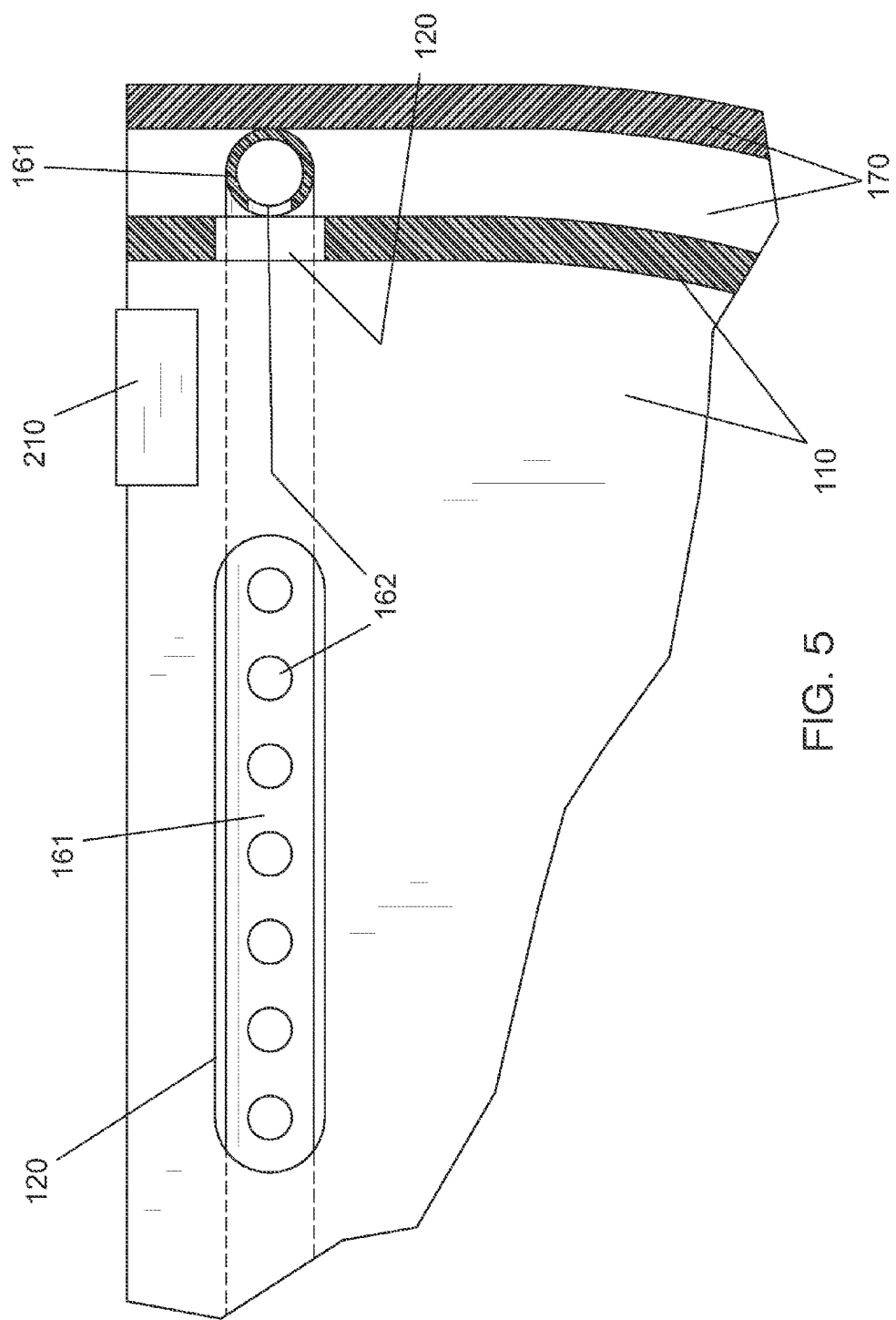
FIG. 5 shows a close up view of the slot of the present invention.
Figure 6:
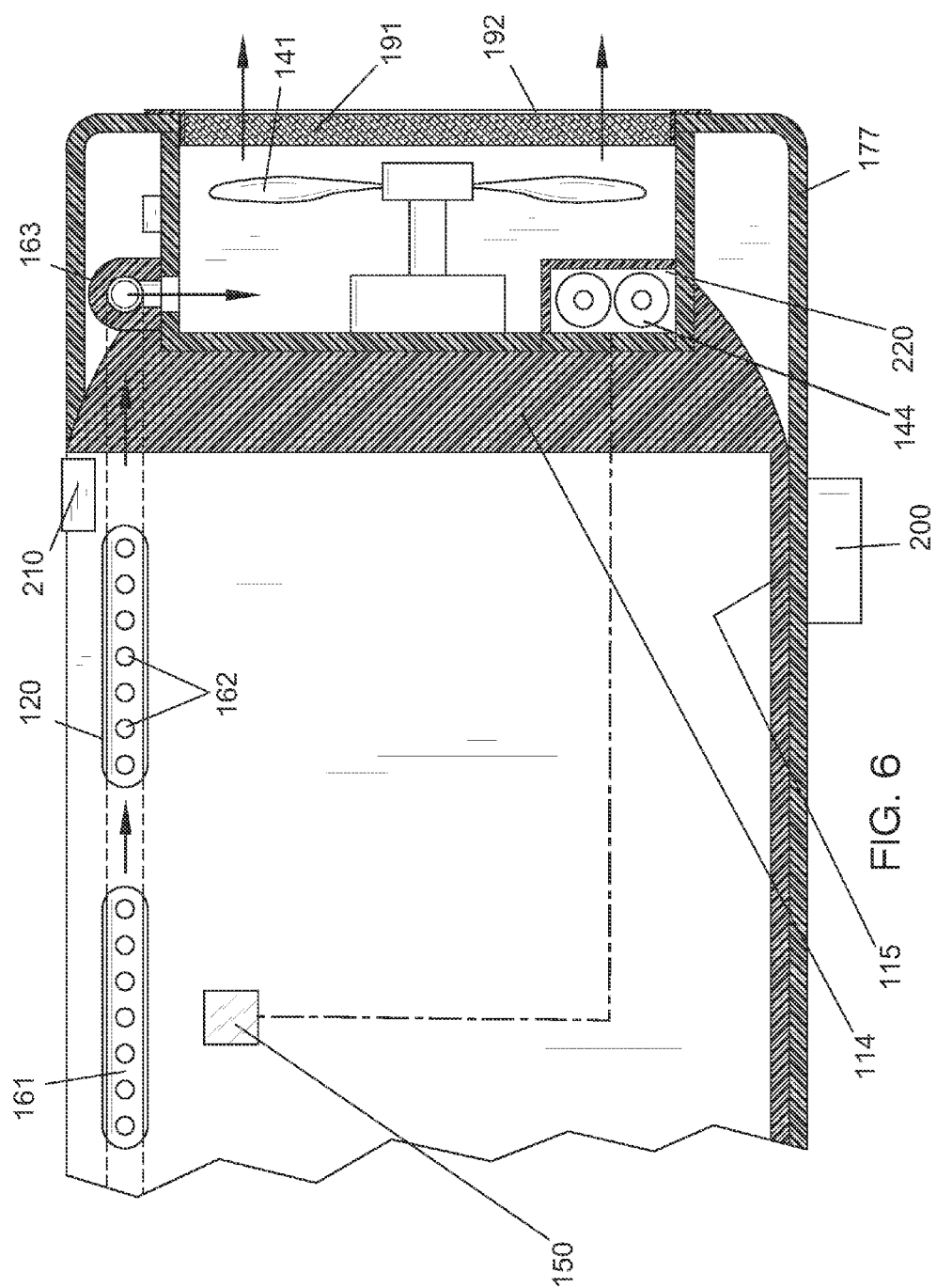
FIG. 6 shows a cross-sectional view of the present invention in a sagittal plane featuring the fan assembly.

Following is a list of elements corresponding to a particular element referred to herein:
100 Litter box system
110 Inner tray
111 First inner tray wall
112 Second inner tray wall
113 Anterior inner tray wall
114 Posterior inner tray wall
115 Inner tray floor
116 Inner tray top edge
117 Inner tray outer perimeter
120 Slot
130 Fan notch
140 Fan assembly
141 Fan
142 Fan shroud
143 Connecting aperture
144 Power source
150 Motion sensor
160 Air tube assembly
161 Perforated tubing
162 Perforation
163 Air tube manifold
170 Outer tray
171 First outer tray wall
172 Second outer tray wall
173 Anterior outer tray wall
174 Posterior outer tray wall
175 Outer tray floor
176 Outer tray top edge
177 Outer tray floor exterior surface
178 Outer tray top wall
180 Handle slot
190 Fan aperture
191 Fan filter
192 Protective grill
200 Leg
210 Clip
220 Battery box
230 Power switch Referring now to FIG. 1-6, the present invention features a dust-free litter box system (100) for capturing stray particles generated when a pet uses a litter box. In some embodiments, the system (100) comprises an inner tray (110) having a first inner tray wall (111), a second inner tray wall (112), a sloped (curved) anterior inner tray wall (113), a curved posterior inner tray wall (114), an inner tray floor (115), and an inner tray top edge (116). In some embodiments, the anterior inner tray wall (113) and posterior inner tray wall (114) merge into the inner tray floor (115) via a curve. In some embodiments, the inner tray (110) is contiguous. In some embodiments, the sloped anterior inner tray wall (113) and the curved posterior inner tray wall (114) are critical for strength of the inner tray (110) and for ease of cleaning.

In some embodiments, a plurality of slots (120) is located through first inner tray wall (111), the second inner tray wall (112), and the anterior inner tray wall (113) close to the inner tray top edge (116). In some embodiments, a fan notch (130) is centrally located in the posterior inner tray wall (114). In some embodiments, the fan notch (130) is adapted to receive a fan assembly (140) having a fan (141), a fan shroud (142)

with a connecting aperture (143) fluidly located therein, and a power source (144) located therein operatively connected to the fan (141). In some embodiments, the fan assembly (140) comprises a power switch (230). In some embodiments, the fan assembly (140) is located in the fan notch (130). In some embodiments, the inner tray (110) comprises a plurality of motion sensors (150) located in the first inner tray wall (111) and the second inner tray wall (112). In some embodiments, the motion sensors (150) are operatively connected to the power source (144).

In some embodiments, the system (100) comprises an air tube assembly (160) located around an inner tray outer perimeter (117) of the first inner tray wall (111), the second inner tray wall (112), the anterior inner tray wall (113), and the posterior inner tray wall (114) close to the inner tray top edge (116). In some embodiments, the air tube assembly (160) comprises perforated tubing (161). In some embodiments, the perforated tubing (161) is stiff. In some embodiments, the perforated tubing (161) is flexible. In some embodiments, the plurality of slots (120) is fluidly connected to the perforated tubing (161). In some embodiments, the perforated tubing (161) comprises perforations (162) only at the interface with the plurality of slots (120). In some embodiments, the perforated tubing (161) comprises perforations (162) throughout its length. In some embodiments, the air tube assembly (160) comprises an air tube manifold (163) fluidly connected thereto near the posterior inner tray wall (114). In some embodiments, the air tube manifold (163) is adapted to fluidly connect to the fan shroud (142) via the connecting aperture (143).

In some embodiments, the system (100) comprises an outer tray (170) having a first outer tray wall (171), a second outer tray wall (172), a curved anterior outer tray wall (173), a posterior outer tray wall (174), an outer tray floor (175), an outer tray top wall (178), and an outer tray top edge (176). In some embodiments, the outer tray (170) is contiguous. In some embodiments, the first outer tray wall (171) and the second outer tray wall (172) each comprise a handle slot (160) centrally located therein. In some embodiments, a fan aperture (190) is centrally located in the posterior outer tray wall (174). In some embodiments, the fan aperture (190) is adapted to receive a fan filter (191) and a protective grill (192). In some embodiments, the fan filter (191) and protective grill (192) are removably located in the fan aperture (190). In some embodiments, the fan filter (191) comprises a plurality of filters.

In some embodiments, the inner tray (110) is removably located in the outer tray (170). In some embodiments, the fan (141) is activated via the motion sensors (150) for providing a suction source for the system (100). In some embodiments, stray particles are drawn into the air tube assembly (160) through the plurality of slots (120). In some embodiments, the stray particles exit the air tube assembly (160) and enter the fan shroud (142) through the connecting aperture (143). In some embodiments, the stray particles exit the fan shroud (142) and enter the fan filter (191). In some embodiments, a dust-free litter box system (100) is adapted to capture stray particles generated when a pet uses a litter box system (100).

In some embodiments, the system (100) is located on a plurality of legs (200) located on an outer tray floor exterior surface (177).

In some embodiments, the system (100) comprises a plurality of clips (210) attached to the inner tray top edge (116) and the outer tray top edge (176) for attaching the inner tray (110) to the outer tray (170).

In some embodiments, the power supply is located in a sealed battery box (220).

In some embodiments, using the air tube assembly (160) is critical for the effectiveness of the invention. In some embodiments, the air tube assembly (160) is replaceable and easy to clean. In some embodiments, the perforated tubing (161) comprises perforations less than ⅛ inch. In some embodiments, the perforated tubing (161) comprises perforations between ⅛ inch and ¼ inch. In some embodiments, the perforated tubing (161) comprises perforations between ¼ inch and ½ inch. In some embodiments, the perforated tubing (161) comprises perforations greater than ½ inch.

In some embodiments, the perforated tubing (161) is ¼ inch. In some embodiments, the perforated tubing (161) is ⅜ inch. In some embodiments, the perforated tubing (161) is ½ inch. In some embodiments, the perforated tubing (161) is ⅝ inch. In some embodiments, the perforated tubing (161) is ¾ inch.

As used herein, the term "about" refers to plus or minus 10% of the referenced number.

The disclosures of the following U.S. Patents are incorporated in their entirety by reference herein: U.S. Pat. No. D 612,654; U.S. Patent Publication No. 2003/0168017 A1; U.S. Pat. No. 6,175,201; U.S. Pat. No. 6,123,048; U.S. Pat. No. 5,511,513; U.S. Pat. No. 5,044,325; and U.S. Pat. No. 4,552,093.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way.

The reference numbers recited in the below claims are solely for ease of examination of this patent application, and are exemplary, and are not intended in any way to limit the scope of the claims to the particular features having the corresponding reference numbers in the drawings.

What is claimed is:

1. A dust-free lifter box system (100) for capturing stray particles generated when a pet uses a litter box, the system (100) comprises:
   (a) an inner tray (110) having a first inner tray wall (111), a second inner tray wall (112), a sloped (curved) anterior inner tray wall (113), a curved posterior inner tray wall (114), an inner tray floor (115), and an inner tray top edge (116), wherein the anterior inner tray wall (113) and posterior inner tray wall (114) merge into the inner tray floor (115) via a curve, wherein a plurality of slots (120) is disposed through the first inner tray wall (111), the second inner tray wall (112), and the anterior inner tray wall (113) proximal to the inner tray top edge (116), wherein a fan notch (130) is centrally disposed in the posterior inner tray wall (114), wherein the fan notch (130) is adapted to receive a fan assembly (140) having a fan (141), a fan shroud (142) with a connecting aperture (143) fluidly disposed therein, and a power source (144) located therein operatively connected to the fan (141), wherein the fan assembly (140) is disposed in the fan notch (130), wherein the inner tray (110) comprises a plurality of motion sensors (150) disposed in the first inner tray wall (111) and the second inner tray wall (112), wherein the motion sensors (150) are operatively connected to the power source (144);

(b) an air tube assembly (160) disposed around an inner tray outer perimeter (117) of the first inner tray wall (111), the second inner tray wall (112), the anterior inner tray wall (113), and the posterior inner tray wall (114) proximal to the inner tray top edge (116), wherein the air tube assembly (160) comprises perforated tubing (161), wherein the plurality of slots (120) is fluidly connected to the perforated tubing (161), wherein the perforated tubing (161) comprises perforations (162) only at the interface with the plurality of slots (120), wherein the air tube assembly (160) comprises an air tube manifold (163) fluidly connected thereto proximal to the posterior inner tray wall (114), wherein the air tube manifold (163) is adapted to fluidly connect to the fan shroud (142) via the connecting aperture (143); and (c) an outer tray (170) having a first outer tray wall (171), a second outer tray wall (172), a curved anterior outer tray wall (173), a posterior outer tray wall (174), an outer tray floor (175), an outer tray top wall (178), and an outer tray top edge (176), wherein the first outer tray wall (171) and the second outer tray wall (172) each comprise a handle slot (180) centrally disposed therein, wherein a fan aperture (190) is centrally disposed in the posterior outer tray wall (174), wherein the fan aperture (190) is adapted to receive a fan filter (191) and a protective grill (192), wherein the fan filter (191) and protective grill (192) are removably disposed in the fan aperture (190); wherein the inner tray (110) is removably disposed in the outer tray (170), wherein the fan (141) is activated via the motion sensors (150) for providing a suction source for the system (100), wherein stray particles are drawn into the air tube assembly (160) through the plurality of slots (120), wherein the stray particles exit the air tube assembly (160) and enter the fan shroud (142) through the connecting aperture (143), wherein the stray particles exit the fan shroud (142) and enter the fan filter (191), wherein a dust-free litter box system (100) is adapted to capture stray particles generated when a pet uses the litter box system (100).

2. The system (100) of claim 1, wherein the system (100) is disposed on a plurality of legs (200) disposed on an outer tray floor exterior surface (177).

3. The system (100) of claim 1, wherein the system (100) comprises a plurality of clips (210) attached to the inner tray top edge (116) and the outer tray top edge (176) for attaching the inner tray (110) to the outer tray (170).

4. The system (100) of claim 1, wherein the power supply is disposed in a sealed battery box (220).

* * * * *